Patented Apr. 2, 1940

2,195,573

UNITED STATES PATENT OFFICE 2,195,573

LAYING OF DUST

Wolf Kritchevsky, Chicago, Ill., assignor to Ninol, Inc., Chicago, Ill., a corporation of Illinois No Drawing. Application February 12, 1937, Serial No. 125,380

20 Claims. (Cl. 94—25)

My invention relates to the laying of dust and is particularly concerned with a method of overcoming dust problems in mines and ordinary roadways.

The problem of laying dust, particularly in mines and on roadways, has received considerable study for many years and, while numerous proposals have been advanced for coping with the problem, no solution has been reached which is wholly satisfactory and which has met with widespread acceptance and approval. In connection with the laying of coal dust in mines, it has been proposed to utilize an incombustible dust such as stone dust to decrease the inflammability of the coal dust. While suitable for this purpose, the utilization of stone dust does not alleviate the situation so far as the laying of dust is concerned. Indeed, it accentuates it and, in addition, it introduces a health hazard in that the tendency to silicosis is markedly increased. It has also been suggested to spray or otherwise contact the dust in roadways, passages and the like with water but this, too, has not proven feasible. The water has little, if any, affinity for the dust, and, accordingly, the water forms in segregated pools on top of the dust with the result not only that the dust situation is not helped but formation of puddles on the roads hinders and makes travel difficult and unsatisfactory. There are various other disadvantages attending the use of water with which those skilled in the art are familiar and which it is unnecessary to discuss at this time.

I have evolved a method of and composition for the laying of dust which is simple and efficacious, overcomes the deficiencies of prior art practices and introduces various advantages which were not heretofore known.

In general, my invention comprises the utilization of an aqueous solution of a chemical compound or of a class of chemical compounds, which I shall describe hereinafter, which is applied to the roadway or other place where the dust is to be laid. A suitable manner of application is in the form of a spray and a relatively weak solution of the chemical compounds is employed, generally from 0.05% to 1%. The chemical compounds which I employ have a remarkable capacity to impart an affinity to the dust particles for the aqueous material which the water alone does not possess. This results in an absorption of the aqueous material by the dust particles to a relatively substantial depth with the result that the dust is prevented or retarded from being distributed in the atmosphere where the ground, roadway or the like is agitated as, for example, by the passage of traffic thereover.

The chemical compounds which I have found unusually effective for my present purpose are condensation products of alkylolamines and higher organic acids, especially the higher fatty acids. In general, these chemical compounds fall into two distinct classes (1) those wherein the molal ratio of the alkylolamine to the higher organic acid is one to one or at least not greater than one to one, and (2) those wherein the molal ratio of the alkylolamine to the higher organic acid is at least two to one or not substantially less than two to one. While both of these classes of compounds may, in a sense, be regarded as condensation products of alkylolamines and higher organic acid substances, still in many cases there is a wide difference in various of their properties. In general, I have found that the substances falling in the second class are much superior for my purposes.

In preparing the chemical compounds which I employ herein, the condensation may be effected at temperatures slightly below 100° C., but for appreciable results the temperature should preferably be somewhat above 120° C. Condensations have been successfully carried out as high as 250° C. It may be stated that the temperature range should be high enough to obtain appreciable speed of reaction but should not be high enough to cause decomposition of the resulting product. I have found that, for practical purposes, the best temperatures are between about 150° C. and 175° C. for most of the substances coming within the class of my invention. The time required for reaction may be as long as twenty hours or more at the lowest temperatures and as short as 15 minutes at the higher temperatures. Condensations may be made in neutral solutions or with the aid of condensing agents of either alkaline or acid character. The nature of the condensing agent has an effect upon the speed of reaction and the temperature required. Although I have used several different condensing agents, I have found none which offers sufficient advantage in a major number of cases to be worthwhile using in the practical carrying out of my invention.

Considering first the substances falling within the first subclass of the compounds which I may employ, I list hereinafter several illustrative examples for preparing the compounds which I employ in my invention.

Example 1

One mol of triethanolamine is condensed with one mol of stearic acid at a temperature between 150° C. and 180° C. for two to four hours, the mixture being stirred during the condensation.

Example 2

One mol of triethanolamine acetate and one mol of linoleic acid are condensed at a temperature of 150° C. to 175° C. for two to four hours, the mixture being stirred during the condensation.

Example 3

One mol of abietic acid is condensed with one mol of triethanolamine hydrochloride at a temperature of approximately 180° C. for a period of four to five hours, the mixture being stirred during the condensation.

Example 4

Three mols of stearic acid are condensed with one mol of triethanolamine at a temperature of 150° C. to 175° C. for a period of four to six hours, the mixture being stirred during condensation.

Example 5

One mol of diethanolamine and one mol of octanoic acid are condensed at a temperature of 160° C. to 180° C. for two to four hours, the mixture being stirred during condensation.

Example 6

One mol of monoethanol-ethylene-diamine is condensed with one mol of stearic acid at a temperature of 150° C. to 170° C. for a period of three to five hours, the mixture being stirred during condensation.

Example 7

One mol of monoethanol-ethylene-tetramine and one mol of oleic acid are condensed at a temperature of 140° C. to 160° C. for a period of three to five hours, the mixture being stirred during condensation.

The products which I have described above are either soluble or readily dispersible in water, particularly in the presence of an acid. It will be understood, of course, that these properties will vary depending upon the particular alkylol amine and the particular higher organic acid substances which are condensed as well as upon the molal ratio of the alkylolamine to the higher organic acid substance.

The second sub-class of substances which I have discussed above is that in which one mol of a higher organic acid, particularly higher fatty acid, is condensed with two mols or more of an alkylolamine, or not substantially less than two mols of alkylolamine. These condensation products are completely soluble in water, are stable in the presence of both acid and alkali, and will not precipitate in the presence of calcium and/or magnesium salts. In other words, these seem to retain all of their properties in any medium.

For the benefit of those skilled in the art, I give hereinafter a number of representative examples which are by no means exhaustive, but are sufficient to teach those skilled in the art the manner in which my invention may be practiced.

Example 8

One mol of oleic acid is condensed with three mols of triethanolamine, the procedure being the same as in the first example. An oily product is obtained of perfect solubility and other valuable characteristics.

Example 9

The ethanol of the amides of coconut oil fatty acids is condensed with one mol of diamylamine. A solid fat substance is obtained of very good technical properties.

Example 10

One mol of coconut oil fatty acids and two mols of diethanolamine are condensed for three hours at a temperature of 130° C. to 150° C. An oil-like substance is obtained which is perfectly soluble in water and stable in acid and alkali solution.

Example 11

One mol of linoleic acid and three mols of diethanolamine are condensed at a temperature of between 110° C. and 135° C. to form a perfectly water soluble oil-like condensation product, soluble in many solvents.

Example 12

One mol of abietic acid is condensed with three mols of diethanolamine. The resulting product is a thick oily substance.

Example 13

One mol of sulphonated oil is condensed with one mol of diethanolamine, and one mol of triethanolamine.

Example 14

One mol of coconut oil fatty acids is condensed with two mols of a mixture of ethanolamines representing the crude mixture obtained in the process of the manufacture of this product. The crude mixture is composed of mono-, di-, and triethanolamines. The temperature of the condensation may be 160° C. to 170° C.

Example 15

One mol of sebacic acid is condensed with four mols of diethanolamine at a temperature of 150° C. to 165° C. for four or five hours. The resulting product has excellent hydrotropic properties.

It will be evident that, in the examples listed hereinabove wherein no specific temperatures are recited, reaction temperatures falling within the general range previously and hereafter mentioned in the specification are suitable.

I employ the term "alkylol" in describing the compounds which may be employed in my invention in a general sense to include substances like monoethanolamine, diethanolamine, triethanolamine, diethyl-alkylolamine, monoethyl-alkylolamine, butanolamine, hexanolamine, cyclohexylethanolamine, triethanolammoniumhydroxide, the alkylolamines of glycerine, sugar, sugar alcohols such as sorbitol and mannitol, and other mono- and poly-valent alcohols. In addition, alkylol di- and poly-amines can satisfactorily be utilized, for example, alkylol derivatives of ethylene diamine, triamine, tetramine, and so forth.

By the term "higher organic acids" or "higher fatty acids", I include acids having a chain of at least six carbon atoms. I have also successfully used fatty acids derived from waxes having as high as thirty-five carbon atoms or more with good results. Examples of suitable fatty acids, as shown above, are stearic acid, oleic acid, lauric acid, coconut oil fatty acids, linoleic acid, palmitic acid, and others, such as the wax fatty acids. It will also be understood that the acids which I condense with the alkylolamines need not necessarily be mono-basic acids. Di-basic and poly-basic acids can also be used, such as sebacic acid and japanic acid. I may also use cyclic acids, such as naphthenic acid, abietic acid, and quinaldine-carboxylic acid. It is not necessary that the free acids, such as the free fatty acids, be employed, but I can also use fats as a source of the fatty acids, in which case glycerine or other alcohols forming the fatty esters split off during the condensation. In place of the fats, I may also use sulphuric acid esters of fats, like sulphonated castor oil, as well as the substitution products thereof such as the halogenous and sulphur substitution products. I may also use the acid halides such as stearyl chloride, but in this latter case relatively low temperatures must be used for the condensation. As a source of fatty acids, I may also employ acid anhydrides. It is obvious to the skilled chemist that when employing ordinary glyceride esters as a source of fatty acids, the number of equivalents of fatty acid must be taken into consideration in calculating the molal ratio of the fatty acid with respect to that of the alkylol amine.

It is not necessary to have the same alkylolamine in the reaction but two or more varied amines can be used. For instance, one molecule of a fatty acid can be condensed with three molecules of alkylolamines; one, for example, being a mono-alkylolamine, one a di-, and one a tri-alkylol amine. Thus, for example, one may condense a mixture of stearic and oleic acids with diethanolamine, the mean molecular weight of these acids being determined so that the desired molal ratio of the diethanolamine to the higher fatty acid mixture is obtained.

It is also to be understood that, in connection with the second subclass of the compounds which I may employ for my present processes, one mol of alkylol derivative can be substituted by a straight alkylamine. In other words, satisfactory compositions can be made by condensing one mol of an alkylolamine with one mol of an alkylamine and one mol of a higher fatty acid or higher organic acid.

With further regard to this second subclass of compounds, it will be understood that such covers condensation or reaction products which contain substantial proportions of condensation products of alkylolamines and higher fatty acids or the like in which the molal ratio of the alkylolamine to higher fatty acid is at least two to one. Thus, for example, if one should condense a mixture of an alkylolamine and a higher fatty acid wherein the molal ratio of the alkylolamine to the higher fatty acid is, say, 1.5 or 1.8 to 1, such products would be within the scope of my second subclass since they would contain a substantial proportion of products corresponding to the condensation product of a mixture of an alkylolamine and a higher fatty acid whose molal ratio is 2 to 1.

The condensation may advantageously be carried out in either one or a plurality of stages. In the first method, the fatty acid or similar material is mixed with the alkylolamine and condensed at the proper temperature and for the proper length of time. In the second method, one mol or alkylolamine may be first condensed with a fatty acid or similar material and the resulting product then condensed with an additional mol of alkylolamine and so on. In some cases, by proceeding in accordance with this second method, products are obtained with improved properties over what would result if the same ingredients were condensed in the one stage process.

When a crude mixture of alkylolamines is used, mixtures of condensation products of the various types are obtained. In any usual process, when alkylolamines are synthesized, a mixture is formed. Thus, for example, when triethanolamine is prepared, it contains a mixture of mono-, di- and triethanolamine. This mixture can be directly condensed with the higher fatty acids or similar organic acid substances to form products which are useful for the purposes of my invention. In this way, the necessity of expensive purifying processes is avoided.

In an earlier part of the present specification, I have referred to temperatures at which the condensation reaction is carried out by stating that temperatures slightly below 100° C. could be employed, but that a temperature high enough to cause decomposition of the final product should not be used. For practical purposes, I have found that any temperature between 120° C. and 300° C., generally speaking, can be used and the resulting products will serve admirably for my present purposes. While the difference in temperature employed is mainly one of speed of the reaction, some slight variations in the product may be noted if wide variations of temperatures are used. The temperature employed may be modified by the use of different pressure conditions. For example, if the condensation is carried out in a vacuum, much lower temperatures in many cases can be employed and/or the heating time decreased.

Certain derivatives of the compounds described above may also be employed for my present purposes with advantageous results. These derivatives are alkylation, arylation and aralkylation products of my previously described substances. Among the agents which I may employ for this purpose are the following: methyl chloride, methyl iodide, dimethyl sulphate, benzyl chloride, phenyl iodide, ethylene chlorhydrin, and paratoluene ethyl sulphonate. The following examples are illustrative of methods of making such derivatives:

*Example 16*

About 462 pounds of a condensation product of coconut oil fatty acids and diethanolamine, the molal ratio of the diethanolamine to the acids being two to one, and resulting from heating together approximately equal weights of said reacting constituents at a temperature between 160 degrees C. and 170 degrees C. for from about 3 to 7½ hours (the length of time depending upon the temperature), is mixed, at room temperature, with 140 pounds of dimethyl sulphate. The dimethyl sulphate is added slowly to the condensation product at about room temperature. The reaction is exothermic and the temperature spontaneously rises. The addition of the dimethyl sulphate is regulated so that the temperature rises to between 100 degrees C. and 110 degrees C. After all of the dimethyl sulphate has been added, the mass may be heated, if desired, to maintain it between 100 degrees C. and 110 degrees C. to complete the reaction. It is advisable not to substantially exceed a temperature of about 130 degrees C. in order to obtain the best results. The reaction mass is kept at the desired temperature for about two hours.

*Example 17*

A condensation product of one mol of stearic acid and two mols of monoethanolamine is prepared by heating the mixture at about 200 degrees C. for approximately three hours. About 400 parts by weight of the resulting waxy product is treated with 140 parts by weight benzyl chloride and the reaction mixture is kept at about 110 degrees C. to 125 degrees C., exercising the same general precautions as described in connection with Example 16. The reaction is permitted to proceed until the benzyl chloride odor disappears.

*Example 18*

One mol of oleic acid and two mols of diethanolamine are condensed at a temperature of between 160 degrees C. and 180 degrees C. for three to four hours. About 500 parts by weight of this reaction product, at room temperature, is reacted with about 150 parts by weight of methyl iodide. The reaction takes place with the evolution of heat and an oleaginous product results.

I have gone into considerable detail hereinabove in disclosing the nature of the compounds which are efficacious for my present purposes and the methods of preparing them. I shall now describe the manner in which said compounds are utilized for the purpose of laying dust.

In order to point out the efficacy of my invention, we may take a road having a layer of dust thereon which is readily disturbed by vehicular or pedestrian traffic with the resulting formation of clouds of dust in the atmosphere. The disagreeable as well as hazardous effects of such conditions is so well known as to necessitate no particular comment. If, now, a 0.1% to 1.0% aqueous solution of the condensation products which I have described hereinabove, for example, in Examples 10, 11 and 14, is sprayed upon the road, the water readily permeates the dust and after a short time the dust dries and cakes and becomes quite firm, and subsequent disturbance of the dust will raise little or no dust clouds. As soon as the water has completely evaporated from the surface of the road, and more particularly when the road surface begins to show signs of becoming dusty, a spray of plain water is applied. This water will be readily absorbed by the dust deposit or caked dust deposit and the road will be restored to its condition of relative or substantial freedom from dustiness. The chemical compounds of my invention have so slight a vapor pressure that the initial application will last for several months so that all that is necessary is periodically to spray the road surface with water in order to maintain the road in an excellent condition so far as dust formation is concerned. It will, of course, be understood that the amount of water or aqueous solution which is sprayed on the road surface depends upon various factors such as the nature of the dust, the efficacy of the solution to permeate the dust, the amount of dust, etc. In general, however, an amount of water should not be employed which will cause the formation of mud puddles or the like in the road. As a general proposition, from fifteen to forty gallons of solution per thousand square feet of road surface is satisfactory but, as indicated, this may be varied depending upon the specific factors involved in a given situation.

It must not be understood that my solution need be used alone. Indeed, my procedure has proven highly efficacious when employed in conjunction with existing practices. Thus, for example, it is common practice to treat roads with hygroscopic salts such as calcium chloride. The practice of my invention may be combined with this procedure with excellent results. Thus, after a preliminary treatment of the road surface with a 0.1% to 1.0% aqueous solution of any of the condensation products disclosed above, either before or after the treated surface has dried out, the road surface may be contacted, preferably by spraying, with an aqueous solution of calcium chloride of from 10% to 30% strength. The road will keep in excellent condition from the dustiness standpoint over a period of months with no additional treatment.

As I have indicated above, my invention finds an extensive and important field of use in mines, particularly coal mines. It is well known that coal dust is highly inflammable and the cause of numerous mine explosions has been attributed directly to coal dust explosions. As I have stated above, the situation has been met, from the standpoint of preventing or decreasing the possibility of explosions, by diluting the coal dust with several times the quantity of stone dust or like incombustible dust. By proceeding in accordance with the principles of my invention, it is possible to eliminate stone dusting and combat both the explosion hazard as well as the dust laying problem in a simple and efficacious manner.

The application of a 0.1% or a 1.0% aqueous solution of the condensation products which I have described above, in the form of a spray or the like, to the passage and walls of the mine will result in the dust being effectually layed. The aqueous solutions of the compounds of my invention have the capacity of imparting to the coal dust an affinity for moisture. Here, again, as in the case of the treatment of ordinary road surfaces, subsequent applications only of water need be made in order to maintain the mine roadways in a non-dusty condition. The periodic times at which such application of water, preferably by spraying, need be made, depend upon the particular conditions occurring in the mine interior which is being treated. Although there may be fresh accumulations of coal dust on the surface of the previously treated dust, it has been found that such fresh accumulations of dust tend to adhere to the undercoating of caked dust and will not, in general, be disturbed to form clouds of dust in the atmosphere at least for a period of time. As soon as the surfaces tend to cause the formation of dust clouds by reason of the passage thereover of vehicular or pedestrian traffic, an application of plain water can be made with facility and the non-dusting tendency restored.

It will be understood that, while the application of the teachings of my invention may result in the substitution of such treatment for treatments in accordance with prior art practice such as the conventional stone dusting, my invention may also be used as an adjunct to or in conjunction with, for example, stone dusting. When so used, it will overcome to a large measure the undesirable effects resulting from the practice of stone dusting alone in that it will prevent or retard the formation of suspensions of the coal dust as well as the stone dust in the atmosphere in the mine. This will overcome to a large measure the objections to the use of stone dust which, in the past, has been severely condemned because of its alleged inducing of silicosis.

It is apparent that my invention may be utilized in any environment where a dust problem occurs. Thus, for example, it may be used in cement plants and in coal yards where coal is handled considerably and there is a definite problem of eliminating or reducing the formation of dust. A particularly efficacious use of my invention resides in coal mines where mechanical equipment is used in freeing the coal from its veins. For example, the solutions of my invention may be sprayed either at the coal face or on the cutter bar. In this latter connection my invention possesses numerous advantages, one of the most outstanding of which is that in many instances rust formation on the cutter bar is definitely inhibited. It is common practice in many coal mines to spray the cutter bar with water but this possesses the serious disadvantage, among others, of causing a rusting of the metal parts. Aqueous solutions of many of my condensation products possess the very desirable property of inhibiting or preventing corrosion of iron and the like and this enables their usage in this connection with a very decided advantage over procedures which have heretofore been carried out. Similarly, this advantage occurs in those cases where there are vehicle tracks along a particular roadway which is subjected to treatment in accordance with my invention to lay dust thereon.

While I have described the application of the solutions of my invention by means of a spray or the like, it is evident that any method of effecting a substantially uniform distribution of the solution over the roadway or material to be treated is satisfactory.

With regard to the concentration products which are employed in aqueous solution, it is apparent that the proportions may be varied. In general, I have found that concentrations of 0.1% to 1.0% are effective for my purposes, but this, of course, depends upon a plurality of factors. In some case, lower concentrations will be effective and in other cases it may be necessary to employ higher concentrations such as two or three percent, but this can readily be determined by the skilled operator.

While I have described my invention in considerable detail, it is to be understood that the description is not to be taken as a limitation of the scope of my invention, such being determined by the appended claims.

What I claim as new and desire to protect by Letters Patent of the United States is:

1. The method of laying dust which comprises contacting it with an aqueous solution of a condensation product of an alkylolamine and a higher organic acid substance.

2. The method of laying dust which comprises contacting it with an aqueous solution of a condensation product of an alkylolamine and a higher fatty acid substance.

3. The method of laying dust which comprises contacting it with an aqueous solution of a condensation product of an alkylolamine and a fatty acid substance having between 12 and 18 carbon atoms.

4. The method of claim 1 wherein the molal ratio of the alkylolamine to the higher organic acid substance is not more than one to one.

5. The method of claim 2 wherein the molal ratio of the alkylolamine to the higher fatty acid substance is not more than one to one.

6. The method of claim 3 wherein the molal ratio of the alkylolamine to the fatty acid substance is not more than one to one.

7. The method of claim 1 wherein the molal ratio of the alkylolamine to the higher organic acid substance is not substantially less than two to one.

8. The method of claim 2 wherein the molal ratio of the alkylolamine to the higher fatty acid substance is not substantially less than two to one.

9. The method of claim 3 wherein the molal ratio of the alkylolamine to the fatty acid substance is not substantially less than two to one.

10. The method of laying dust which comprises contacting it with an aqueous solution of a condensation product of a poly-nitrogenous alkylolamine and a higher organic acid substance.

11. The method of laying dust which comprises contacting it with an aqueous solution of a condensation product of a poly-nitrogenous alkylolamine and a higher fatty acid substance.

12. The method of laying dust which comprises contacting it with an aqueous solution of a condensation product of a poly-nitrogenous alkylolamine and a fatty acid substance having between 12 and 18 carbon atoms.

13. The method of claim 1 wherein the concentration of the condensation product in the aqueous solution is of the order of 0.1% to 1.0%.

14. The method of laying dust which comprises contacting it with an aqueous solution of a condensation product of an alkylolamine and a fatty acid substance having between 12 and 18 carbon atoms, the solution containing said condensation product in concentrations of the order of 0.1% to 1.0%.

15. The method of laying dust which comprises contacting it with an aqueous solution containing approximately 0.1% to 1% of a condensation product of an alkylolamine and a fatty acid having from 12 to 18 carbon atoms, the molal ratio of the alkylolamine to the fatty acid being not substantially less than two to one.

16. The method of laying coal dust which comprises spraying it with an aqueous solution of a condensation product of an alkylolamine and a higher organic acid substance.

17. The method of laying coal dust resulting from the operation of a cutter bar against a coal face which comprises spraying an aqueous solution of a condensation product of an alkylolamine and a higher organic acid substance against either the coal face or the cutter bar.

18. The method of laying dust in roadways and passageways which comprises spraying said roadways and passageways with an aqueous solution containing a small percentage of a condensation product of an alkylolamine and a fatty acid substance having from 12 to 18 carbon atoms.

19. The method of laying dust which comprises contacting it with an aqueous solution containing a small percentage of a condensation product of an alkylolamine and a higher organic acid substance, and, at periodic times thereafter, contacting said dust with water.

20. The method of claim 19 wherein the organic acid substance is a fatty acid having between 12 and 18 carbon atoms.

WOLF KRITCHEVSKY.